April 20, 1954
W. FONDILLER
2,676,305
ISOTHERMAL ELECTRIC CABLES
Filed Dec. 12, 1950
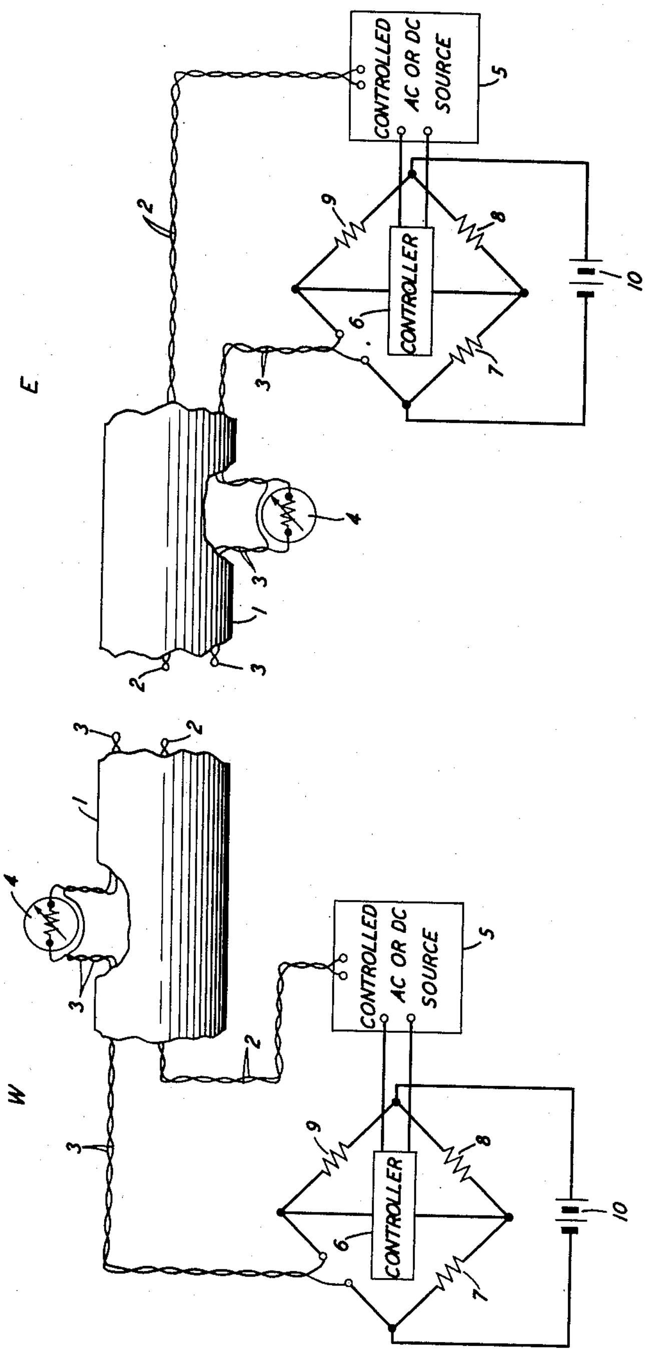
INVENTOR
WILLIAM FONDILLER
BY
H. A. Burgess
ATTORNEY Patented Apr. 20, 1954

2,676,305

UNITED STATES PATENT OFFICE 2,676,305

ISOTHERMAL ELECTRIC CABLES

William Fondiller, New York, N. Y., assignor to Bell Telephone Laboratories, Incorporated, New York, N. Y., a corporation of New York Application December 12, 1950, Serial No. 200,474

10 Claims. (Cl. 333—2)

This invention relates generally to electric cables and more particularly to cables used for purposes of electrical communication.

One object of the invention is to maintain the transmission characteristics of electric cables substantially constant under substantially all ambient temperature conditions.

Another and more particular object is to eliminate the need for expensive regulatory apparatus to compensate for variations in cable transmission characteristics due to temperature changes.

Electric cables such as telephone cables normally carry only the feeble currents of electrical communication, and their temperatures are, therefore, controlled by the ambient temperature. Wide temperature changes, however, have an adverse effect on the operating characteristics of such cables. In a long telephone cable, for example, temperature effects due to atmospheric changes may cause an attenuation change of as much as twenty-five per cent between minimum and maximum temperatures. Aerial cables, especially, are subject to wide diurnal and seasonal temperature variations. Changes in transmission level of this magnitude are intolerable, and it has heretofore been necessary to provide regulators in long telephone circuits which automatically adjust the amplification of repeaters to compensate for temperature effects. In a coaxial system, the cost of equipment for regulation is often as much as twenty per cent of the cost of the repeaters.

In accordance with a principal feature of the present invention, variations in the operating characteristics of a telephone cable caused by changes in the ambient temperature are eliminated by maintaining a substantially constant cable temperature, i. e., within plus or minus half a degree Fahrenheit from a predetermined level. With the variations in operating characteristics eliminated, there is no necessity of providing expensive equipment to regulate the amplification of the repeaters in the circuit to compensate for such variations.

In accordance with another feature of the invention, the temperature of a telephone cable is elevated above the ambient temperature. For any given period of time, the temperature of the cable is held substantially constant at a point equal to or greater than the highest expected ambient temperature. Heat is supplied to the cable by electrical means and, since a relatively small amount of power is required, constant transmission characteristics are thereby provided at a minimum of cost.

In accordance with a further feature of the invention, heating current is transmitted over at least one heating conductor located in the central portion of the cable. The conductor or conductors are so placed in order to obtain the most favorable temperature gradient relative to ambient temperatures. In polyethylene sheathed cable, an effective barrier to the dissipation of heat is provided by the plastic sheath. In metal sheathed cable, it may be desirable to provide a heat-insulating sheath surrounding the cable conductors inside of the metal sheath to reduce heat loss.

In accordance with still another feature of the invention, temperature-sensitive means within the cable is utilized to maintain the cable temperature at the assigned level. Such temperature-sensitive means serves to detect variations in cable temperature and to supply a deviation signal transmitting such variations to means regulating the flow of heating current. By way of example, the temperature-sensitive means may have a resistance which changes with temperature and be connected into a bridge circuit which, in turn, operates a control device regulating the flow of heating current.

A more complete understanding of the invention may be obtained from a study of the following detailed description of a specific embodiment. In the drawing, the single figure is a schematic diagram of an embodiment of the invention which includes a telephone cable.

The isothermal system shown includes a length of telephone cable 1 which is composed of an outer sheath which may have a heat insulating layer inside of it. For convenience, W and E are used to signify the west and east terminals, respectively, of this length of cable. The cable conductors, both coaxial and paired wires, are located within the sheath. A pair of heating conductors 2 extend into cable 1 from either end and are located centrally within the insulating sheath in order to give a favorable temperature gradient relative to ambient temperatures. Heating conductors 2 are shown, by way of example, as twisted pairs leading into cable 1 from each end, with each pair extending approximately half the length of the cable 1 to furnish heat to its respective half of cable 1. At approximately the center, lengthwise along cable 1, the heating conductors 2 of each pair are joined to furnish a complete circuit from each end of cable 1. Each half of cable 1 is thus separately heated. For short sections of cable, however, a single heating pair extending throughout the length of the cable would suffice.

A pair of control wires 3 extend half way into cable 1 from each end and are also located within the insulating layer. Control wires 3 are also shown, by way of example, as twisted pairs. The wires 3 of each pair are joined at the center of the cable 1 to furnish a complete circuit from each end of cable 1. Each half of cable 1 thus has its own control circuit. In each half of cable 1, approximately midway along the length of each half, at least one thermistor 4 is connected into the control circuit. As already indicated, for short sections of cable a single control pair extending through the length of the section would be adequate.

At each end of cable 1, the heating conductors 2 are connected to a heating current source 5, which may supply either alternating or direct current. The heating current control circuits are substantially the same at both ends of cable 1 and, for that reason, are described together, with like parts bearing like reference numerals.

In order to maintain the cable temperature substantially constant, temperature-sensitive control circuits are provided for each source 5. Each circuit includes a suitable current control element 6 for the respective source 5, and each pair of control wires 3 is connected as one arm of a bridge circuit. At each end of cable 1, this bridge circuit is composed of, in its respective arms, a sensing circuit comprising the pair of control wires 3 and the associated thermistor 4, a first resistor 7, a second resistor 8, and a third resistor 9. A battery 10 is connected between the junctions of resistors 8 and 9 and of the sensing circuit and resistor 7. Controller 6 is connected between the other two corners of the bridge circuit, and its output is connected to source 5. The function of controller 6, which is of conventional design, is to regulate the output from source 5, causing it to increase for a current of given polarity from the bridge and to decrease for current of opposite polarity.

A long telephone transmission line may be made up of a number of heated cable sections with heating stations located between each section. The exact spacing of heating stations will depend upon such practical considerations as the allowable voltage applied to the heating conductors 2 and the ambient temperatures expected to be encountered.

In the operation of the embodiment of the invention which has been described, heating current is supplied to heating conductors 2 from the sources 5. Each bridge circuit has its components chosen so that it is balanced when the cable temperature is at a predetermined level. Under such conditions, the flow of heating current remains constant, and no unbalance current flows to the controller 6. If the temperature of cable 1 falls below the predetermined level, the resistance of thermistor 4 increases, since thermistors usually have a negative temperature coefficient of resistance. The bridge becomes unbalanced, and current flows through controller 6 in a direction which causes an increase in the current flow from source 5, the amount of the increase depending upon the degree of unbalance. The cable temperature is thus caused to rise. As the cable temperature rises, the resistance of thermistor 4 decreases until the cable temperature reaches the assigned level, and the bridge again comes to a balance. Current then ceases to flow through controller 6, and the heating current is restored to its normal level. If the cable temperature rises above the assigned level, the process is reversed. Thus, the heating system is automatically controlled to keep the cable temperature within approximately half a degree Fahrenheit of the predetermined value, and variations in the transmission characteristics of the cable due to temperature changes are avoided.

The temperature at which cable 1 is maintained is chosen so as to be equal to or higher than the highest ambient temperature to which cable 1 is likely to be subjected. From the standpoint of maintaining fixed cable transmission properties, it is immaterial how far above the highest ambient temperature the cable temperature is maintained, the effect of a wide differential being only to require a larger heating current than a smaller differential would require.

Several cable temperatures may be selected for purposes of economy of operation. Thus, the cable may be maintained at a temperature equal to or higher than the highest expected atmospheric temperature during the summer months and at a similarly determined but lower temperature during the winter months. Two or three cable temperatures may be selected, depending on the season of the year, and repeater amplification may be adjusted manually at these widely separated intervals. Similarly, sections of cable in a long transmission system heated in accordance with the present invention may contemporaneously be kept at different temperatures, the temperature levels chosen depending on the geographical location of the particular sections. The expense of heating can thereby be kept at a minimum.

Heating a cable in accordance with the present invention to promote stability in its transmission characteristics is a relatively economical process because of the simplicity of the equipment required. Expensive regulating apparatus to adjust repeater amplification is not required, and because of the heat insulating qualities of cable insulation, the power required to heat the cable is not excessive.

Because of the importance of maintaining toll telephone cables in service under adverse conditions, it has heretofore been the practice to apply gas pressure to such cables and install pressure indicators which would disclose the existence of a leak in the cable sheath which might cause failure of the circuits in the cable. The function previously performed by gas pressure installations can in a measure be performed by the temperature-control apparatus which has been described, since any significant leak in the cable would immediately be reflected in the action of the temperature-sensing equipment.

While the invention has been described with reference to a telephone cable, it is applicable to many other types of electric cables. Further, it is to be understood that the arrangement which has been described is illustrative of the principles of the invention. Numerous other arrangements may be devised by those skilled in the art without departing from the spirit and scope of the invention.

What is claimed is:

1. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending along the length thereof, means to transmit heating current over said heating conductor to elevate the temperature of said electrical conductors to a predetermined level, and means to maintain the temperature of said electrical conductors accurately at said predetermined level by regulating the flow of heating current.

2. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending along the length thereof, means to transmit heating current over said heating conductor to elevate the temperature of said electrical conductors to a predetermined level, and means including at least one temperature-sensitive element within said sheathing to maintain the temperature of said electrical conductors accurately at said predetermined level by regulating the flow of heating current.

3. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor centrally located within said sheathing extending along the length thereof, means to transmit heating current over said heating conductor to elevate the temperature of said electrical conductors to a predetermined level which is above the highest expected ambient temperature, and means including at least one temperature-sensitive element within said sheathing to maintain the temperature of said electrical conductors accurately at said predetermined level by regulating the flow of heating current.

4. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending along the length thereof, means to transmit heating current over said heating conductor to elevate the temperature of said electrical conductors to a predetermined level which is above the highest expected ambient temperature, and means including at least one thermistor within said sheathing to maintain the temperature of said cable accurately at said predetermined level by regulating the flow of heating current.

5. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending along the length thereof, means to transmit heating current over said heating conductor to elevate the temperature of said electrical conductors to a predetermined level which is above the highest expected ambient temperature, and means including at least one thermistor within said sheathing to decrease the flow of heating current whenever the temperature of said electrical conductors rises above said predetermined level and to increase the flow of heating current whenever the temperature of said electrical conductors falls below said predetermined level.

6. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending inward from each end thereof, means to transmit heating current over said heating conductors to elevate the temperature of said electrical conductors to a predetermined level which is above the highest expected ambient temperature, and means to maintain the temperature of said electrical conductors accurately at said predetermined level by regulating the flow of heating current.

7. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending inward from each end thereof, means to elevate the temperature of said electrical conductors to a predetermined level which is above the highest expected ambient temperature comprising means at one end of said cable to transmit heating current over one of said heating conductors and means at the other end of said cable to transmit heating current over the other of said heating conductors, and means to maintain the temperature of said electrical conductors accurately at said predetermined level comprising means to regulate the flow of heating current over one of said heating conductors and means to regulate the flow of heating current over the other of said heating conductors.

8. An electrical signal transmission system in which the transmission characteristics are maintained substantially constant under substantially all ambient temperature conditions which comprises an electric cable having a hollow sheathing of insulating material, a multiplicity of electrical conductors within said sheathing extending along the length thereof, and at least one heating conductor within said sheathing extending inward from each end thereof, means to elevate the temperature of said electrical conductors to a predetermined level which is above the highest expected ambient temperature comprising means at one end of said cable to transmit heating current over one of said heating conductors and means at the other end of said cable to transmit heating current over the other of said heating conductors, and means to maintain the temperature of said electrical conductors accurately at said predetermined level comprising means including a temperature-sensitive element within said sheathing to regulate the flow of heating current over one of said heating conductors and means including another temperature-sensitive element within said sheathing to regulate the flow of heating current over the other of said heating conductors.

9. In combination, an electric cable comprising a hollow sheathing of insulating material and a multiplicity of electrical conductors within said sheathing extending along the length thereof and means to maintain the transmission characteristics of said conductors substantially constant under substantially all ambient temperature conditions comprising at least one heating conductor within said sheathing extending along the length thereof, means to transmit heating current over said conductor to elevate the temperature to a predetermined level which is above the highest expected ambient temperature, and means to maintain the temperature of said cable accurately at said predetermined level by regulating the flow of heating current.

10. An electrical transmission system which comprises a plurality of electric cables connected in tandem transmission relation, each of said electric cables comprising a hollow sheathing of insulating material and a multiplicity of electrical conductors within said sheathing extending along the length thereof, and means to maintain the transmission characteristics of the conductors of each of said cables substantially constant under substantially all ambient temperature conditions comprising at least one heating conductor within each of said cables, means to transmit heating current over each of said heating conductors to elevate the temperature of the respective cable to a respective predetermined level which is above the respective ambient temperature, and means to maintain the temperature of each of said cables accurately at the respective predetermined level by regulating the flow of heating current in the respective heating conductors.

References Cited in the file of this patent

UNITED STATES PATENTS

| Number | Name | Date |
|---|---|---|
| 1,835,080 | Pfleger | Dec. 8, 1931 |
| 1,900,831 | Marter | Mar. 7, 1933 |
| 1,956,715 | Green | May 1, 1934 |
| 2,020,128 | Sticker | Nov. 5, 1935 |
| 2,057,529 | Karapetoff | Oct. 15, 1936 |
| 2,475,309 | Chalberg | July 5, 1949 |